United States Patent
Ito et al.

(10) Patent No.: US 6,915,650 B2
(45) Date of Patent: Jul. 12, 2005

(54) VEHICLE AIR CONDITIONER WITH AUTOMATIC CONTROL OF MAIN BLOWER AND SUB-BLOWER

(75) Inventors: Koji Ito, Nagoya (JP); Takahiro Tokunaga, Kosai (JP); Tomohide Shindo, Kariya (JP); Yoshihiko Okumura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/704,961

(22) Filed: Nov. 10, 2003

(65) Prior Publication Data

US 2004/0098995 A1 May 27, 2004

(30) Foreign Application Priority Data

Nov. 11, 2002 (JP) .......................................... 2002-326869

(51) Int. Cl.[7] .................................................. B60H 1/32
(52) U.S. Cl. ............................ 62/244; 165/217; 454/75
(58) Field of Search ................................ 62/244; 165/42, 165/43, 203, 217; 454/75, 144, 156

(56) References Cited

U.S. PATENT DOCUMENTS 4,711,295 A * 12/1987 Sakurai ...................... 165/203
4,856,710 A * 8/1989 Takada et al. ................. 236/13
4,949,779 A * 8/1990 Kenny et al. ................ 165/203
5,904,052 A * 5/1999 Inoue et al. .................. 62/244

FOREIGN PATENT DOCUMENTS

JP            9-86138        3/1997

* cited by examiner

*Primary Examiner*—William E. Tapolcai
(74) *Attorney, Agent, or Firm*—Harness, Dickey & Pierce, PLC

(57) ABSTRACT

A vehicle air conditioner includes a main blower and a sub-blower for blowing air into a passenger compartment. The main blower is disposed to blow conditioned air in a front air passage toward a front seat area in the passenger compartment, and the sub-blower is disposed in a rear air passage having an air flow resistance larger than that in the front air passage so that a part of air blown by the main blower is blown by the sub-blower toward a rear seat area in the passenger compartment through the rear air passage. In the air conditioner, an air amount blown by the sub-blower is controlled to be increased in accordance with a decrease of an air amount blown by the main blower. Therefore, automatic control of the air amount blown by the sub-blower can be accurately performed.

6 Claims, 5 Drawing Sheets

VEHICLE AIR CONDITIONER WITH AUTOMATIC CONTROL OF MAIN BLOWER AND SUB-BLOWER

CROSS REFERENCE TO RELATED APPLICATION

This application is based on Japanese Patent Application No. 2002-326869 filed on Nov. 11, 2002, the disclosure of which is incorporated herein by reference.

BACKGROUND OF THE INVENTION

1. Field of the Invention

The present invention relates to a vehicle air conditioner having a main blower and a sub-blower, which can perform air-conditioning of a plurality of different areas in a passenger compartment by using a single air conditioning unit. More particularly, the present invention relates to a control operation of the main blower and the sub-blower, with an automatic control of the sub-blower.

2. Related Art

There have been proposed various kinds of vehicle air conditioners each of which performs air-conditioning of a plurality of different areas, specifically, a front seat area and a rear seat area in a passenger compartment by using a single air conditioning unit.

For example, in a vehicle air conditioner disclosed in JP-A-9-86138, a front air conditioning unit for air-conditioning a front seat area of a passenger compartment is provided with an additional function for blowing off conditioned air also to a rear seat area of the passenger compartment. Specifically, an inlet portion of a rear face duct is connected to the front air conditioning unit at a position immediately after an evaporator, so that conditioned air (cool air) is blown toward a rear upper side of the passenger compartment from a rear face air outlet provided at an outlet of the rear face duct. Further, an inlet portion of a rear foot duct is connected to the front air conditioning unit at a position immediately downstream of a heater core, so that conditioned air (warm air) is blown toward a rear lower side in the passenger compartment from a rear foot air outlet provided at an outlet of the rear foot duct.

In addition, a rear sub-blower is disposed in a rear face duct in addition to a main blower for blowing air in an air passage of the front air conditioning unit, so that conditioned air is blown to the rear face air outlet by the rear sub blower. When the sub-blower starts air blowing operation toward the rear face duct while the main blower operates, an electrical voltage applied to a driving motor of the main blower is corrected to be increased so that it can prevent an air amount to be blown to the front seat area from being decreased.

In the air conditioner of this document, there is described regarding a voltage correction input to the driving motor of the main blower, that is, an automatic correction of an air amount to be blown to the front seat side. However, the air amount level to be blown to the rear seat area of the passenger compartment is selected by switching a rear vent switch (i.e., rear face amount switch) to 0 position→1 position→2 position→3 position.

When the amount of air blown to the front seat area is changed, the air amount to be blown to the rear seat area of the passenger compartment is also changed in accordance with a change of the air blowing amount to the front seat area. Therefore, in order to remove a change of the rear air-blowing amount due to a change of the front air-blowing amount, it is necessary to frequently operate the rear vent switch.

Further, because cold air immediately after the evaporator of the front air conditioning unit is blown to the rear upper side of the passenger compartment through the rear face duct, the temperature of air blown to the rear upper side duct cannot be adjusted. In addition, because the sub-blower is arranged to blow air only toward the rear upper side, air blowing operation to the rear lower side of the passenger compartment is performed by using the main blower. Generally, a rear foot duct is a slender duct, so air flow resistance (pressure loss) in a rear foot passage becomes greatly larger than that in a front foot passage. As a result, an air amount to be blown to the rear lower side becomes smaller, and a heating shortage may be caused in the rear seat area of the passenger compartment.

The above-described technique of the related art has been described in a case where the front seat area and the rear seat area in the passenger compartment are air-conditioned by using the single front air conditioning unit. However, there is the same problem also in a case where a front area and a passenger's seat in the passenger compartment are air-conditioned by using the single front air conditioning unit, because air flow resistance in a seat-side air passage becomes extremely large as compared with the air flow resistance in the front air passage.

SUMMARY OF THE INVENTION

In view of the above-described problems, it is an object of the present invention to provide a vehicle air conditioner having a main blower for blowing air toward a first area of a passenger compartment and a sub-blower for blowing a part of air blown by the main blower toward a second area in the passenger compartment. In the vehicle air conditioner, an air amount to be blown to the second area in the passenger compartment can be accurately automatically controlled.

According to the present invention, a vehicle air conditioner includes a main blower for blowing air, a heat exchange unit for performing heat exchange with air blown by the main blower, and a case having a first air passage through which conditioned air after being heat-exchanged with the heat exchange unit flows toward a first area in the passenger compartment and a second air passage through which conditioned air after being heat-exchanged in the heat exchange unit flows toward a second area in the passenger compartment. In the air conditioner, a sub-blower for blowing conditioned air in the second air passage toward the second area of the passenger compartment is disposed in the second air passage having an air flow resistance larger than that in the first air passage, and a control unit for controlling operation of the main blower and the sub-blower includes a first control means for controlling an air amount blown by the main blower and a second control means for controlling an air amount blown by the sub-blower. In addition, the second control means changes the air amount blown by the sub-blower in accordance with a change of the air amount blown by the main blower. For example, the second control means increases the air amount blown by the sub-blower in accordance with a decrease of the air amount blown by the sub-blower. Accordingly, even when the air amount of the main blower changes, the air amount blown by the sub-blower can be automatically corrected. Therefore, the air amount blown by the sub-blower can be maintained approximately at a predetermined target value. As a result, the air conditioning of the second area in the passenger compartment can be accurately performed without being affected by a change of the air amount of the sub-blower.

Preferably, a first temperature adjustment unit is disposed for adjusting a temperature of the conditioned air in the first air passage, and a second temperature adjustment unit disposed for adjusting a temperature of the conditioned air in the second air passage. In addition, the control unit further includes a first target temperature calculating means for calculating a first target temperature of conditioned air to be blown to the first area of the passenger compartment, and a second target temperature calculating means for calculating a second target temperature of conditioned air to be blown to the second area of the passenger compartment. In addition, the first control means controls a voltage applied to a driving motor of the main blower in accordance with the first target temperature, the second control means determines a voltage applied to a driving motor of the sub-blower in accordance with the second target temperature, and the second control means corrects the voltage applied to the driving motor of the sub-blower in accordance with the voltage applied to the driving motor of the main blower. Accordingly, the air amount of the sub-blower, automatically determined in accordance with the second target temperature can be maintained, regardless of the change of the air amount blown by the main blower.

For example, the first area is a front seat area in the passenger compartment, the first air passage is a front air passage through which air flows toward the front seat area, the second area is a rear seat area in the passenger compartment, and the second air passage is a rear air passage through which air flows toward the rear seat area. In this case, preferably, the rear air passage includes a rear face passage through which air flows toward a rear upper side and a rear foot passage through which air flows toward a rear lower side, and a rear mode selecting unit is disposed for opening and closing the rear face opening and the rear foot opening. Therefore, by the operation of the sub-blower, air conditioning feeing given to a passenger on a rear seat in the passenger compartment can be improved.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERED EMBODIMENTS

A preferred embodiment of the present invention will be described with reference to the accompanying drawings.

Figure 1:
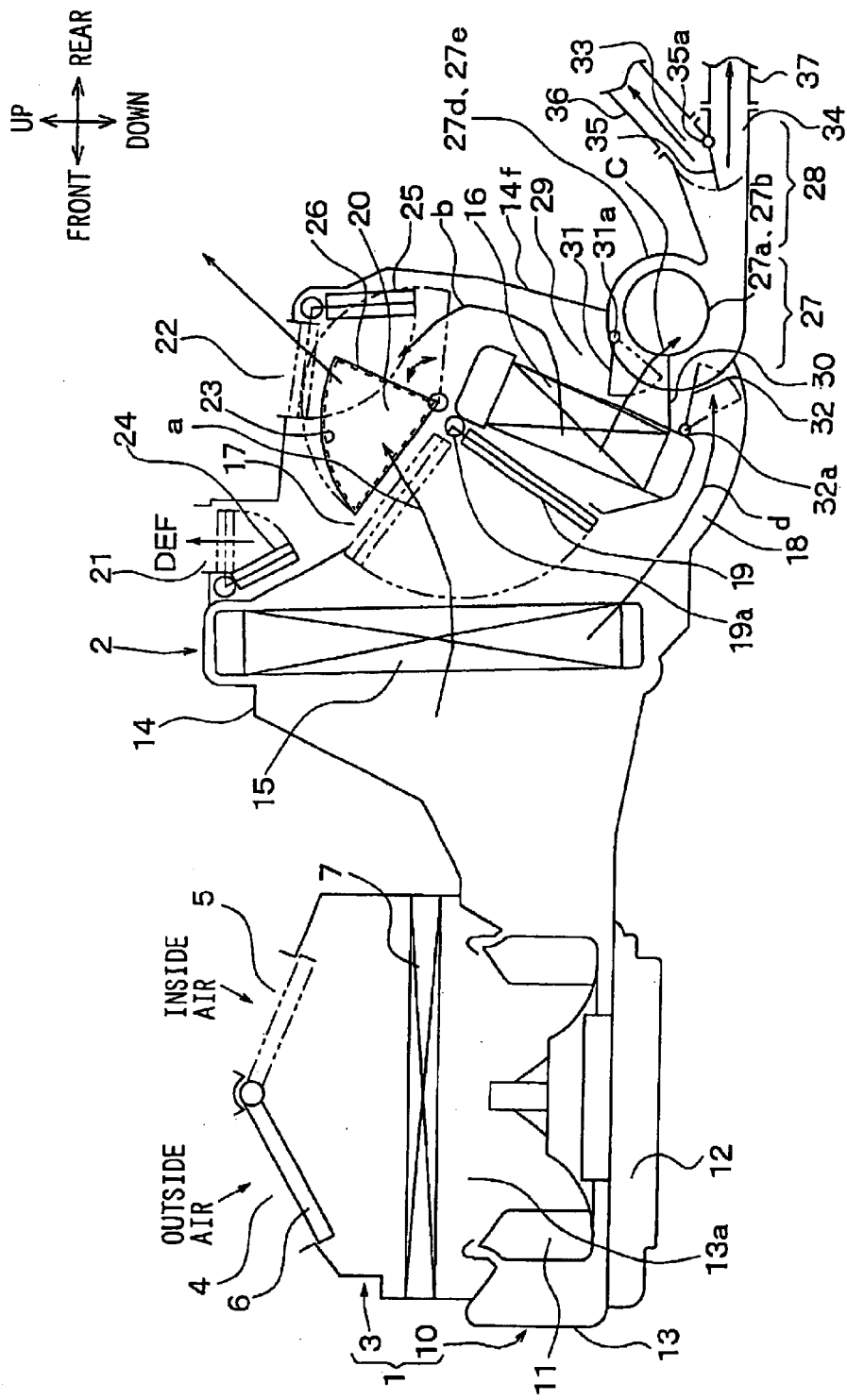
FIG. 1 is a schematic cross-sectional view showing a front air conditioning unit of a vehicle air conditioner in accordance with a preferred embodiment of the present invention.
Figure 2:
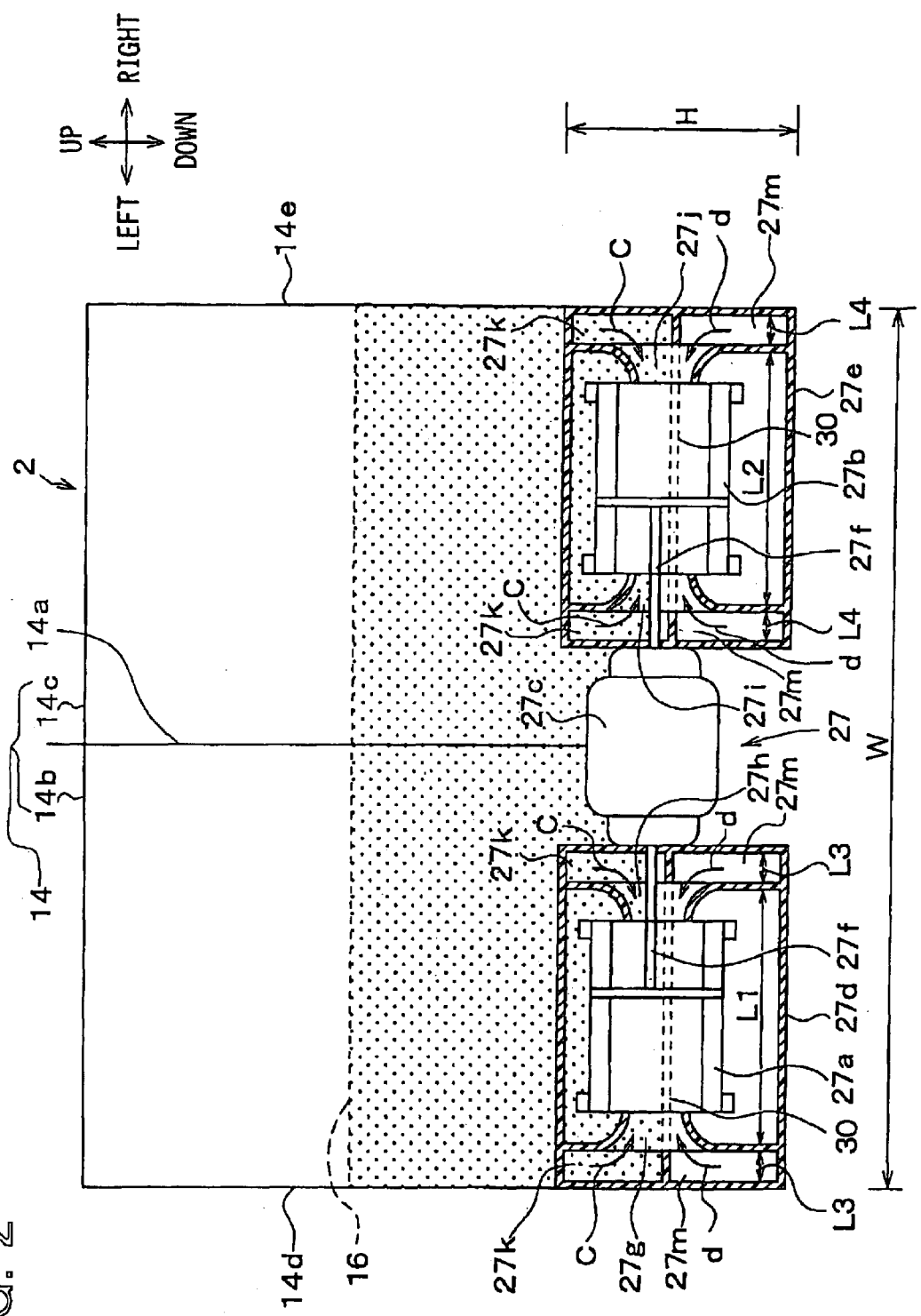
FIG. 2 is a schematic cross-sectional view showing a sub-blower of the vehicle air conditioner in FIG. 1.

An interior air conditioning device shown in FIG. 1 is broadly constructed of a blower unit 1 and a heat exchange unit 2. In FIG. 1 and FIG. 2, arrows showing "up and down", "front and rear", and "left and right" indicate directions in a state where the heat exchange unit 2 is mounted in a vehicle, respectively. In FIG. 1, for convenience of preparing a drawing, the blower unit 1 is arranged on the front side of the vehicle of the heat exchange unit 2, but in reality, the blower unit 1 is arranged at an offset position in the lateral direction (i.e., right-left direction) of the vehicle of the heat exchange unit 2. That is, the heat exchange unit 2 is arranged nearly at the center in the lateral direction of the vehicle inside an instrument panel (i.e., dashboard) in the passenger compartment. The blower unit 1 is arranged to be offset to a front passenger's seat side from the position of the heat exchange unit 2 in the lateral direction of the vehicle.

The blower unit 1 has an inside/outside air switching box 3 at the upper portion thereof. This inside/outside air switching box 3 has an outside air introduction port 4, an inside air introduction port 5, and an inside/outside air switching door 6. The inside/outside air switching door 6 opens and closes the outside air introduction port 4 and the inside air introduction port 5 to selectively introduce outside air (i.e., air outside the passenger compartment) and inside air (i.e., air inside the passenger compartment). The inside/outside air switching door 6 is connected to and turned by an inside/outside air switching mechanism (not shown). This inside/outside air switching mechanism is constructed of an actuator mechanism using a servomotor. Then, a filter 7 for removing dust, bad smell and the like in air introduced into the inside/outside air switching box 3 is arranged at the lower side of the inside/outside air switching box 3. Therefore, air introduced into the inside/outside air switching box 3 is cleaned by the filter 7.

A main blower 10 is arranged below the filter 7 in the blower unit 1. This main blower 10 has a blower fan 11 made of a centrifugal fan having many blades arranged in an annular shape, a motor 12 for rotating the blower fan 11, and a spiral scroll case 13 for receiving the blower fan 11. A suction port 13a from which air from the filter 7 is sucked is shaped like a bell mouth. The suction port 13a is formed in the top portion of the scroll case 13.

Next, the heat exchange unit 2 will be described. The heat exchange unit 2 has a case 14 made of resin. The case 14, as shown in FIG. 2, is constructed by combining two division cases 14b, 14c that are molded in such a manner as to divide the case 14 into two left and right parts at a division plane 14a located at the center in the lateral direction of the vehicle. The left and right parts are fastened by a fastening member (not shown) such as a suitable clamp to be integrated. The air outlet of the scroll case 13 is connected to an opening on a front part of the case 14. Thus, air flows into the front part of the case 14 by operating the blower fan 11 in the blower unit 1.

Air blown by the blower unit 1 flows through the case 14 from the front side of the vehicle to the rear side of the vehicle. An evaporator 15 and a heater core 16 are arranged in series in order from the upstream side of air flow in the case 14. The evaporator 15 constructs a well-known refrigeration cycle together with a compressor, a condenser and a pressure reducing unit (all of which are not shown). The evaporator 15 is a cooling heat exchanger for cooling air in the case 14. The evaporator 15 has a heat exchange core part constructed of flat tubes through which a low-pressure refrigerant having decompressed by a pressure reducing unit flows and corrugated fins connected to the flat tubes.

The heater core 16 is a heating heat exchanger for heating air in the case 14 by using hot water (engine cooling water) flowing therethrough as a heat source. The heater core 16 has a heat exchange core part constructed of flat tubes through which the hot water flows and corrugated fins connected to the flat tubes. Here, in FIG. 2, a finely dotted area shows an area where the heater core 16 is arranged.

In the case 14, a front cold air passage 17 is formed above the heater core 16 and a rear cold air passage 18 is formed below the heater core 16. Cold air after passing through the evaporator 15 bypasses the heater core 16 while passing through these cold air passages 17, 18.

A front air mixing door 19 is disposed between the evaporator 15 and the heater core 16 in the case 14. The front air mixing door 19 is constructed of a plate door that is rotated around a rotary shaft 19a arranged near the top end of the heater core 16. The front air mixing door 19 adjusts the ratio of cold air "a" passing through the front cold air passage 17 and hot air "b" passing through the heater core 16 and hence adjusts the temperature of air to be blown a front area in the passenger compartment. That is, a front seat area temperature adjusting unit is constructed with the front air mixing door 19.

The rotary shaft 19a of the front air mixing door 19 is connected to and is rotated by a front area temperature adjusting mechanism (not shown). The front area temperature adjusting mechanism is constructed of an actuator mechanism using a servomotor.

In order to ensure a space in which the front air mixing door 19 is turned, the heater core 16 is arranged in such a manner that its top end is slanted to the rear side of the vehicle as compared with its bottom end. Then, a front air mixing portion 20 for mixing the cold air "a" and the hot air "b" is formed above the heater core 16 in the case 14.

A plurality of front air outlet openings 21, 22, 23 are arranged in the upper rear portion of the case 14. Conditioned air from the front air mixing portion 20 flows into these front air outlet openings 21, 22, 23. A defroster opening 21 among these front air outlet openings 21, 22, 23 is open at the top surface of the case 14 and communicates with a defroster air outlet port (not shown) for blowing off the conditioned air toward the inside surface of a windshield glass through a defroster duct (not shown). The defroster opening 21 is opened or closed by a defroster door 24.

A front face opening 22 is open at a vehicle rear side of the defroster opening 21 in the top surface of the case 14. The front face opening 22 communicates with a front face air outlet port (not shown) for blowing off the conditioned air toward the upper half body of a passenger on the front seat through a front face duct (not shown). Then, the front face opening 22 is opened or closed by a front face door 25.

Front foot openings 23 are open at portions on the left and right sides of the front air mixing portion 20 of the left and right side walls 14d, 14e of the case 14 (see FIG. 2). The left and right front foot openings 23 communicate with left and right front foot air outlet ports (not shown) for blowing off the conditioned air toward the feet of the passenger on the front seat through a front foot duct (not shown). These left and right front foot openings 23 are opened or closed by the left and right front foot doors 26.

Each of these front foot openings 23 and front foot doors 26 is approximately shaped like a fan in this embodiment. The left and right fan-shaped foot doors 26 are turned along left and right side walls 14d, 14e of the case 14, thereby opening and closing the front foot openings 23. The position of the front door 26 shown by the solid line in FIG. 1 shows a state where the front foot door opening 23 is fully closed.

The above-described doors 24, 25, 26 construct front air outlet mode doors for switching front air outlet modes, and are connected to and operated in association with each other by a common front air outlet mode operating mechanism via a link mechanism (not shown). The front air-outlet mode operating mechanism is constructed of an actuator mechanism using a servomotor.

A rear sub-blower 27 is arranged at a portion separated by a predetermined distance from the bottom portion of the heater core 16 to the downstream side of air flow (to the rear side of the vehicle) in the lower portion in the case 14. The rear sub-blower 27, as shown in FIG. 2, has two blower fans 27a, 27b, a driving motor 27c for driving the two blower fans 27a, 27b, and spiral scroll cases 27d, 27e for receiving the blower fans 27a, 27b. Each of the blower fans 27a, 27b is constructed of a centrifugal fan having many blades arranged in an annular shape. Here, in FIG. 2, a reference symbol H designates the height of the sub-blower 27 and W designates the width (i.e., the dimension in the lateral direction of the vehicle) of the sub-blower 27.

The left and right scroll cases 27d, 27e are formed from a resin integrally with left and right division cases 14b, 14c, respectively. Then, rear air ducts 28 (FIG. 1) are arranged on the downstream sides (rear side of the vehicle) of the left and right scroll cases 27d, 27e. The rear air ducts 28 are provided in such a manner as to join airs blown off from the outlets of the scroll cases 27d, 27e and to guide them toward the rear side of the vehicle. The rear air ducts 28 are also formed integrally with the left and right division cases 14b, 14c together with the scroll cases 27d, 27e.

A driving motor 27c of the sub-blower 27 is constructed of a double shaft type in which its rotary shaft 27f protrudes to both sides in an axial direction and is arranged at the center in the lateral direction of the vehicle with respect to the case 14. Then, the driving motor 27c is arranged in such a manner that its rotary shaft 27f faces in the left and right direction of the vehicle, outside the rear wall surface 14f of the vehicle of the case 14, and is fixed to the scroll cases 27d, 27e.

The blower fans 27a, 27b are arranged on the left and right sides of the driving motor 27c, and the left and right blower fans 27a, 27b are connected to the left and right rotary shafts 27f, respectively. Suction ports 27g to 27j, each shaped like a bell mouth, are formed on the left and right sides of the left scroll case 27d and the right scroll case 27e. That is, the two left and right blower fans 27a, 27b are constructed as double suction fans, respectively.

The above-described respective suction ports 27g to 27j suck cold air and hot air through air passages as described below. A partition wall 30 is arranged for partitioning a hot air passage 29 formed directly behind the heater core 16 and the above-described rear cold air passage 18 from each other in the up-down direction. The partition wall 30, as shown in FIG. 1, is located in the lowermost portion on a downstream air side (rear side of the vehicle) in the heat exchange core part of the heater core 16. Then, the partition wall 30, as shown in FIG. 2, is arranged across the whole area of the case 14 in the lateral direction of the vehicle.

In FIG. 2, the partition wall 30 in a portion L1 between the left and right suction ports 27g, 27h of the left blower fan 27a and in a portion L2 between the left and right suction ports 27i, 27j of the right blower fan 27b is shown by the broken lines, and the partition wall 30 in portions L3 outside the left and right suction ports 27g, 27j and in portions L4 outside the left and right suction ports 27i, 27j is shown by the solid lines. The outside portions L3, L4 construct air inlet spaces. Among the air inlet spaces with the outside portions L3, L4, an upper portion above the partition wall 30 (dotted area) forms a hot air inlet space 27k through which hot air from the hot air passage 29 flows, as shown by arrow "c".

Then, among the above-described air inlet spaces with the outside portions L3, L4, a lower portion below the partition wall 30 (hollow area) forms a cold air inlet space 27m through which cold air from the rear cold air passage 18 flows, as shown by arrow "d", A hot air door 31 shown in FIG. 1 is arranged at each of the above-described four hot air inlet portions 27k and a cold air door 32 shown in FIG. 1 is arranged at each of the above-described four cold air inlet portions 27m. These hot air doors 31 and cold air doors 32, in this embodiment, are constructed of plate doors rotatable about the rotary shafts 31a and 32a, respectively. By adjusting rotation angles of the hot air door 31 and the cold air door 32, the air passage areas of the hot air inlet space 27k and the cold air inlet space 27m can be adjusted.

A total of four hot air doors 31 and a total of four cold air doors 32 construct a rear temperature adjusting unit for adjusting the temperature of air blown off to the rear seat in the passenger compartment. In this embodiment, the four hot air doors 31 are connected to and operated in association with each other by a rear hot air operating mechanism (not shown) via a link mechanism (not shown). Then, the four hot cold doors 32 are also connected to and operated in association with each other by a rear cold air operating mechanism (not shown) via a link mechanism (not shown). Each of the rear hot air operating mechanism and the cold air operating mechanism is constructed of an actuator mechanism using an independent servomotor.

In this manner, each of the rear hot air operating mechanism and the rear cold air operating mechanism is constructed of an actuator mechanism using an independent servomotor. Thus, it is possible to set a rear shut state where the hot air inlet spaces 27k are fully closed by the four hot air doors 31 and where, at the same time, the cold air inlet spaces 27m are fully closed by the four cold air doors 32.

On the other hand, in a state where conditioned air is blown off toward the rear area in the passenger compartment, in order to adjust the temperature of air blown off toward the rear seat side in the passenger compartment, the rear hot air operating mechanism and the rear cold air operating mechanism are operated in an electrically associated manner. More specifically, in a maximum heating, the hot air inlet spaces 27k are fully opened by the four hot air doors 31 and the cold air inlet spaces 27m are fully closed by the four cold air doors 32. Conversely, in a maximum cooling, the hot air inlet spaces 27k are fully closed by the four hot air doors 31 and the cold air inlet spaces 27m are fully opened by the four cold air doors 32.

Then, in a middle temperature control between the maximum heating and the maximum cooling, the hot air doors 31 and the cold air doors 32 continuously change their turning positions between the maximum heating position and the maximum cooling position to adjust the air passage areas of the hot air inlet spaces 27k and the cold air inlet spaces 27m, respectively. More specifically, when the hot air doors 31 turns to a side where the hot air inlet spaces 27k are fully closed, the cold air doors 32 turns to a side where the cold air inlet spaces 27m are fully opened. In this manner, both of the doors 31, 32 adjust the air passage areas of the hot air inlet spaces 27k and the cold air inlet spaces 27m in such a manner that the air passage area of the air inlet spaces 27k is reversely changed with respect to the air passage area of the cold air inlet spaces 27k.

A tip portion (downstream end portion) on the rear side of the vehicle of the rear air duct 28 is branched to form a rear face opening 33 located on an upper side and a rear foot opening 34 located on a lower side. Then, a rear air outlet mode door 35 is arranged inside the tip portion on the rear side of the vehicle of the rear air duct 28.

The rear air outlet mode door 35, in this embodiment, is constructed of a plate door rotatable around a rotary shaft 35a, to open and close the rear face opening 33 and the rear foot opening 34. The rear air outlet mode door 35 is connected to and operated by a rear air-outlet mode operating mechanism. The rear air-outlet mode operating mechanism is constructed of an actuator mechanism using a servomotor.

A rear face duct 36 is connected to the rear face opening 33, so that conditioned air is blown off toward the upper half body of a passenger on the rear seat from a rear face air outlet port (not shown) provided at the tip portion of the rear face duct 36. Similarly, a rear foot duct 37 is connected to the rear foot opening 34, so that conditioned air is blown off toward the feet of the passenger on the rear seat from a rear foot air outlet port (not shown) provided at the tip portion of the rear foot duct 37.

Each of the rear face duct 36 and the rear foot duct 37 is shaped like a slender duct extending to the rear area in the passenger compartment, and these slender ducts 36, 37 greatly increase the air flow resistance in the rear air passage as compared with the air flow resistance in the front air passage.

Figure 3:
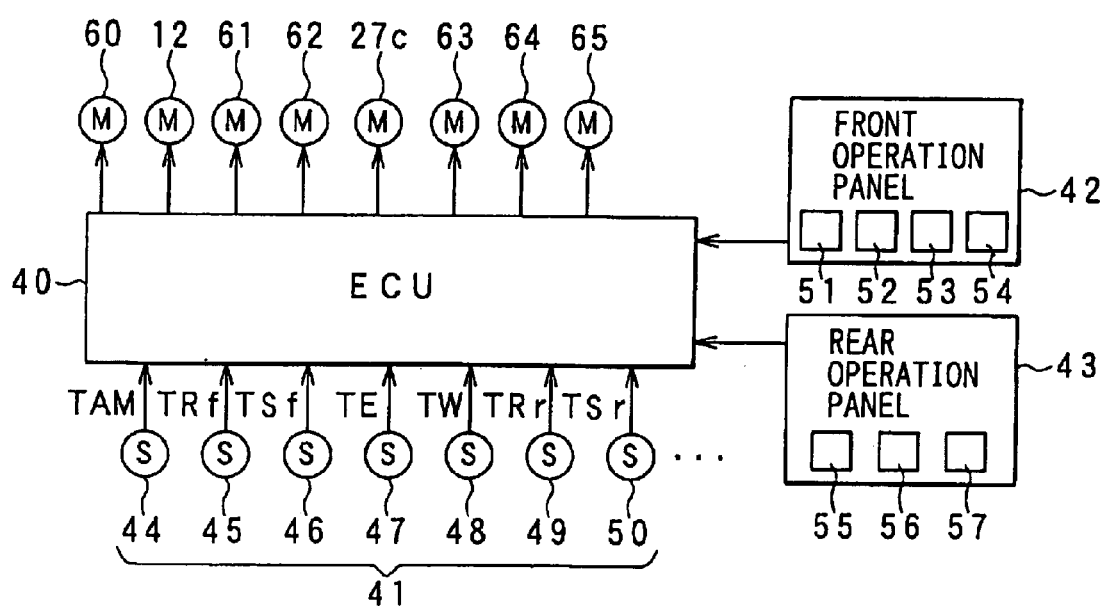
FIG. 3 is a block diagram showing an electric control portion of the vehicle air conditioner according to the embodiment.

FIG. 3 is a block diagram showing an electric control portion in this embodiment, in which various kinds of air conditioning control parts are automatically controlled by an air conditioning control unit 40 (ECU). The air conditioning control unit 40 is constructed of a microcomputer and the like, and controls the air conditioning control parts provided in the blower unit 1 and the heat exchange unit 2 in accordance with a previously set program.

Sensor signals from a sensor group 41 and operation signals from a front air conditioning operation panel 42 provided in an instrument panel portion on the front of a passenger compartment and a rear air conditioning operation panel 43 provided on a rear side in the passenger compartment are inputted to the air conditioning control unit 40.

The sensor group 41, as well known, includes an outside air temperature sensor 44 for detecting an air temperature outside the passenger compartment (i.e., outside air temperature TAM), a front inside air temperature sensor 45 for detecting an inside air temperature TRf on the front side in the passenger compartment, a front solar radiation sensor 46 for detecting a solar radiation amount TSf entering to the front side in the passenger compartment, an evaporator temperature sensor 47 for detecting an air temperature TE blown from the evaporator 12, a water temperature sensor 48 for detecting the temperature TW of hot water circulating through the heat core 13, a rear inside air temperature sensor 49 for detecting an inside temperature TRr on the rear side in the passenger compartment, a rear solar radiation sensor 50 for detecting a solar radiation amount entering to the rear side in the passenger compartment.

The front air conditioning operation panel 42 is provided with a front temperature setting part 51, a front air amount setting part 52, a front air outlet mode setting part 53, and an inside/outside air introduction mode setting part 54. Similarly, the rear air conditioning operation panel 43 is provided with a rear temperature setting part 55, a rear air outlet mode setting part 56, and a rear air amount setting part 57.

Next, as driving means of the various kinds of air conditioning control parts controlled by the air conditioning control unit 40, there are provided a motor 60 of an actuator mechanism for driving the inside/outside air switching door 6 of the blower unit 1, the motor 12 for driving a main blower 10 of the blower unit 1, a motor 61 of an actuator mechanism for driving the front air mixing door 19, a motor 62 of an actuator mechanism for driving front air outlet mode doors 24, 25, 26, the driving motor 27c for driving the rear sub-blower 27, a motor 63 of an actuator mechanism for operating rear hot air doors 31 in association, a motor 64 of an actuator mechanism for operating rear cold air doors 32 in association, and a motor 65 of an actuator mechanism for driving a rear air outlet mode switching door 35.

Next, the operation of this embodiment will be described. When conditioned air blows off only to the front seat area in the passenger compartment, the driving motor 12 of the main blower 10 of the blower init 1 is energized to rotate the blower fan 11. On the other hand, the supply of current to the driving motor 27c of the sub-blower 27 is stopped so that the blower fans 27a, 27b of the sub-blower 27 is stopped.

With this operation, only the main blower 10 is operated so that air blown by the main blower passes through the evaporator 15 to be cooled and dehumidified. Cold air after passing through the evaporator 15 is then branched by the front air mixing door 19 into the cold air "a" passing through the front cold air passage 17 and the hot air "b" passing through the heater core 16. For this reason, by adjusting the flow ratio of the volume of cold air "a" and the volume of hot air "b" by changing the opening of the front air mixing door 19, the temperature of air blown off to the front seat area in the passenger compartment can be adjusted.

The cold air "a" is mixed with the hot air "b" in the air mixing portion 20 so that conditioned air having a desired temperature is obtained. The conditioned air from the air mixing portion 20 is blown to the front area in the passenger compartment from at least one of the front air outlet ports 21, 22, 23, selected by the front air outlet mode doors 24, 25, 26, so that air-conditioning of the front area in the passenger compartment is performed.

At this time, the rear shut state is set in accordance with the stop operation of the sub-blower 27. That is, a stopping state of the operation of the sub-blower 27 is determined by the air conditioning control unit 40, and the motor of the rear hot air operating mechanism is operated by using the control output of the air conditioning control unit 40 to operate the four hot air doors 31 to the fully closed position of the hot air inlet spaces 27k. At the same time, the motor 64 of the rear cold air operating mechanism is operated by the control output of the air conditioning control unit 40 to operate the four cold air doors 32 to the positions for totally closing the cold air inlet spaces 27m. With this operation, the rear shut state can be set so that it can prevent the conditioned air from blowing off to the rear area in the passenger compartment.

Next, when the conditioned air blows off at the same time to both of the front area and the rear area in the passenger compartment, the front air amount setting part 52 and the rear air amount setting part 57 are turned on, and the driving motor 12 of the main blower 10 and the driving motor 27c of the sub-blower 27 of the blower unit 1 are energized to operate the main blower 10 and the sub-blower 27 for the rear seat at the same time.

With this operation, air is blown to the front area in the passenger compartment through the same route by the main blower 10, so that conditioned air blows off to the front area in the passenger compartment from at least one of the front air outlet ports 21, 22, 23 to perform air-conditioning of the front area in the passenger compartment.

On the other hand, at the same time when the sub-blower 27 is operated by the control output of the air conditioning control unit 40, the four hot air doors 31 are operated at the predetermined opening positions of the hot air inlet spaces 27k and the four cold air doors 32 are operated at the predetermined opening positions of the cold air inlet spaces 27m, respectively. With this operation, among hot air that passes through and is heated by the heater core 16, hot air passing through the lower side portion of the heat exchange core part of the heater core 16 passes through the hot air inlet spaces 27k, as shown by arrow "c". Thereafter, hot air from the hot air inlet spaces 27k is sucked into the air suction ports 27g to 27j of the blower fans 27a, 27b. At the same time, cold air passing through the rear cold air passage 18 located below the heater core 16 passes through the cold air inlet spaces 27m as shown by arrow "d", and is sucked into the air suction ports 27g to 27j of the blower fans 27a, 27b.

The hot air and the cold air are sent outside in the radial direction of the fan by the blower fans 27a, 27b, thereby being blown off to the rear air duct 28 from the outlets of the left and right scroll cases 27d, 27e. The hot air and the cold air are mixed each other in a process where they are sucked by the blower fans 27a, 27b and are sent toward the outlets of the scroll cases 27d, 27e, so that conditioned air having a desired temperature can be obtained for the rear area of the passenger compartment.

The air passage areas of the hot air inlet spaces 27k can be continuously adjusted by the rotational positions (openings) of the rear hot air doors 32, and in association of this adjustment, the air passage areas of the cold air inlet spaces 27m can be continuously adjusted by the rotational positions (openings) of the rear cold air doors 31. Thus, the ratio of the volume of hot air sucked into the hot air inlet spaces 27k and the volume of cold air sucked into the cold air inlet spaces 27m can be arbitrarily adjusted by adjusting the turning positions (openings) of the hot air doors 31 and the cold air doors 32, so that conditioned air having a desired temperature also can be blown to the rear seat area of the passenger compartment.

The rear face opening 33 and the rear foot opening 34 are opened or closed by the rear air outlet mode doors 35 arranged in the rear air duct 28 to open only one of the openings 33, 34 or to open both of the openings 33, 34 at the same time. With this operation, conditioned air having a desired temperature passes through the rear face duct 36 or the rear foot duct 37 and blows off to the upper half body or the feet area of the passenger on the rear seat from the rear face air outlet port (not shown) or the rear foot air outlet port (not shown) so as to perform air-conditioning of the rear area in the passenger compartment.

As the rear-only sub-blower 27, a centrifugal blower having characteristics of small air amount and high pressure type can be suitably used. Further, the sub-blower 27 has a comparatively small diameter in the blower fans 27a, 27b (for example, fan diameter: about 70 mm). The height of the blower fans 27a, 27b of the double-suction type sub-blower 27 is about 70 mm, for example.

On the other hand, the main blower 10 is a centrifugal blower having characteristics of low pressure loss type and the fan diameter of the blower fan 11 is sufficiently larger than the sub-blower 27 and is about 160 mm, for example. Then, the height of the blower fan 11 has a sufficiently large size about 80 mm even if the blower fan 11 is a single suction type.

Figure 4:
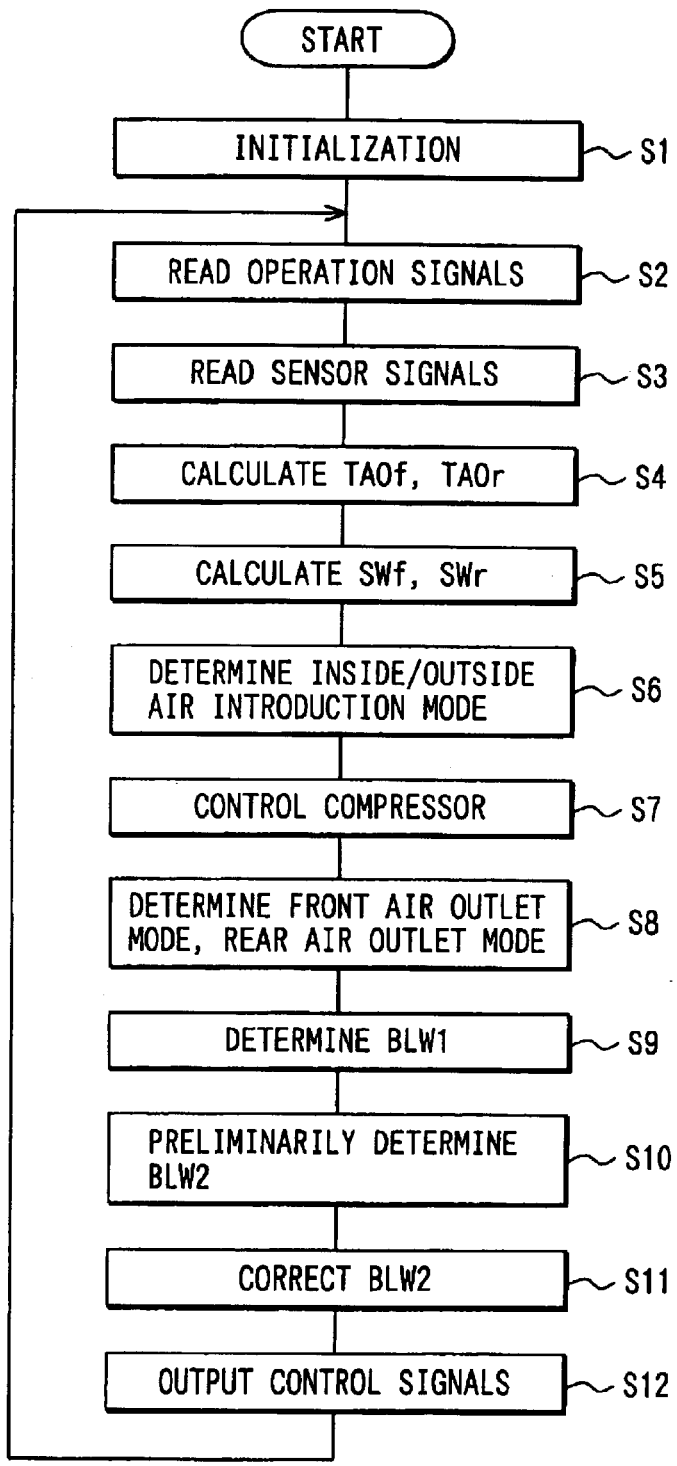
FIG. 4 is a flow diagram showing a control operation of the vehicle air conditioner according to the embodiment.

Next, an automatic air conditioning control of the air conditioning control unit 40 will be now described with reference to FIG. 4. FIG. 4 shows a control routine executed by the air conditioning control unit 40. First, at step S1, various kinds of timers and control flags are initialized. Next, at step S2, operation signals such as a front set temperature signal Tsetf and a rear set temperature signal Tsetr of the temperature setting parts 51, 55 are read from the front and rear air conditioning operation panels 42, 43.

Next, at step S3, in order to detect vehicle environmental state relating to air conditioning operation in the passenger compartment, an outside temperature signal TAM, a front inside air temperature signal TRf, a front solar radiation signal TSf, an evaporator air temperature signal TE, a water temperature signal Tw, a rear inside air temperature signal TRr, and a rear solar radiation signal TSr are read from the various kinds of sensors 44 to 50.

Next, at step S4, a target air temperature TAOf of conditioned air to be blown to the front area in the passenger compartment is calculated based on the following formula (1). This target air temperature TAOf is a target temperature of air, necessary for keeping the temperature in the front area in the passenger compartment at the front set temperature Tsetf regardless of variations in vehicle environmental conditions (air conditioning thermal load conditions).

$$TAOf = Kset \times Tsetf - Kr \times TRf - Kam \times TAM - Ks \times TSf + C \quad (1)$$

wherein Kset, Kr, Kam, and Ks are control gains, respectively, and C is a correction constant. A rear target air temperature TAOr is also independently calculated. Generally, the rear target air temperature TAOr can be calculated in the same way as the front target air temperature TAOf only by substituting Tsetr for Tsetf, TRr for TRf, and TSr for TSf in the formula (1), respectively. Therefore, the description of a specific mathematical equation for the rear target air temperature TAOr will be omitted.

Next, at step S5, a target opening degree SWf of the front air mixing door 19 is calculated by the following formula (2)

$$SWf = [(TAOf - TE)/(TW - TE)] \times 100(\%) \quad (2)$$

SWf=0% means the maximum cooling position of the front air mixing door 19, and SWf=100% means the maximum heating position of the front air mixing door 19.

The target openings SWr of the rear hot air doors 31 and the rear cold air doors 32 can also be calculated in the same manner as the above formula (2) by the use of the rear target air temperature TAOr. In this embodiment, the rear hot air doors 31 can be operated by the motor 63 of the rear hot air operating mechanism and the rear cold air doors 32 can be operated by the motor 64 of the rear cold air operating mechanism, in a manner independent from each other, respectively. However, when conditioned air is blowing off to the rear seat area of the passenger compartment, the ratio between rear hot air amount and rear cold air amount is adjusted by operating the rear hot air doors 31 and the rear cold air doors 32 in association with each other. Thus, a common rear target opening degree SWr can be calculated, and the actual opening degrees of the rear hot air doors 31 and the rear cold air doors 32 can be controlled by the motors 63, 64 so that the actual opening degrees become the common rear target opening degree SWr. When SWr=0%, the rear hot air doors 31 and the rear cold air doors 32 are set at the maximum cooling positions. Thus, the rear hot air doors 31, as described above, are operated to the positions where the hot air inlet spaces 27k are totally closed and the rear cold air doors 32 are operated to the positions where the cold air inlet spaces 27m are fully opened.

Then, when SWf=100%, the rear hot air doors 31 and the rear cold air doors 32 are set at the maximum heating positions. Thus, the rear hot air doors 31, as described above, are operated to the positions where the hot air inlet spaces 27k are fully opened and the rear cold air doors 32 are operated to the positions where the cold air inlet spaces 27m are totally closed.

Next, at step S6, an inside/outside air introduction mode is determined on the basis of the front target air temperature TAOf. For example, if the front target air temperature TAOf is smaller than a predetermined temperature, the inside/outside air introduction mode is set at an inside air circulation mode for introducing inside air from an inside introduction port 5. On the other hand, if the front target air temperature TAOf is higher than the predetermined temperature, the inside/outside air introduction mode is switched to an outside air introduction mode for introducing outside air from an outside introduction port 4.

Next, at step S7, an intermittent control of operation of a compressor (not shown) in a refrigerant cycle having the evaporator 12 is determined. More specifically, when an actual evaporator temperature TE detected by the evaporator temperature sensor 47 is compared with a target evaporator temperature TEO. When the TE is higher than the TEO, a supply of current through an electromagnetic clutch of the compressor is started so as to operate the compressor. On the other hand, when the TE becomes lower than the TEO, the supply of current through the electromagnetic clutch is stopped so as to stop the operation of the compressor. By such an intermittent control of the operation of the compressor, the actual evaporator temperature TE is kept at the target evaporator temperature TEO.

Next, at step S8, an air outlet mode (e.g., front air outlet mode, rear air outlet mode) for setting air blowing direction in the passenger compartment is determined. For example, as the front target air temperature TAOf increases from a lower temperature side, the front air outlet mode is automatically switched in this order of a face (FACE) mode→a bi-level (B/L) mode→a foot (FOOT) mode.

Similarly, as the rear target air temperature TAOr increases from a lower temperature side, the rear air outlet mode is also automatically switched in this order of the face (FACE) mode→the bi-level (B/L) mode→the foot (FOOT) mode by the use of the rear target air temperature TAOr.

Both of the front air outlet mode and the rear air outlet mode can be freely manually set regardless of the front and rear target air temperatures TAOf, TAOr, by manually operating the air outlet mode setting parts 53, 56 of the front and rear operation panels 42, 43.

A defroster mode can be set manually by the front air outlet mode setting part 53. Then, when the defroster mode is set as the front air outlet mode, the rear shut state is forcibly set so as to blow off the total amount of air sent by the main blower 10 to the vehicle windshield to improve defogging and defrosting performance of the vehicle windshield. Here, the rear shut state can be set manually by the rear air outlet mode setting part 56.

Next, at step S9, a main blower input voltage BLW1 (i.e., voltage applied to the main blower) applied to the motor 12 for driving the main blower 10 is determined on the basis of the front target air temperature TAOf. Here, the number of revolutions (air amount) of the main blower 10 is proportional to the electrical voltage applied to the motor, so the air amount of the main blower 10 can be determined by determining the main blower input voltage BLW1.

Figure 5:
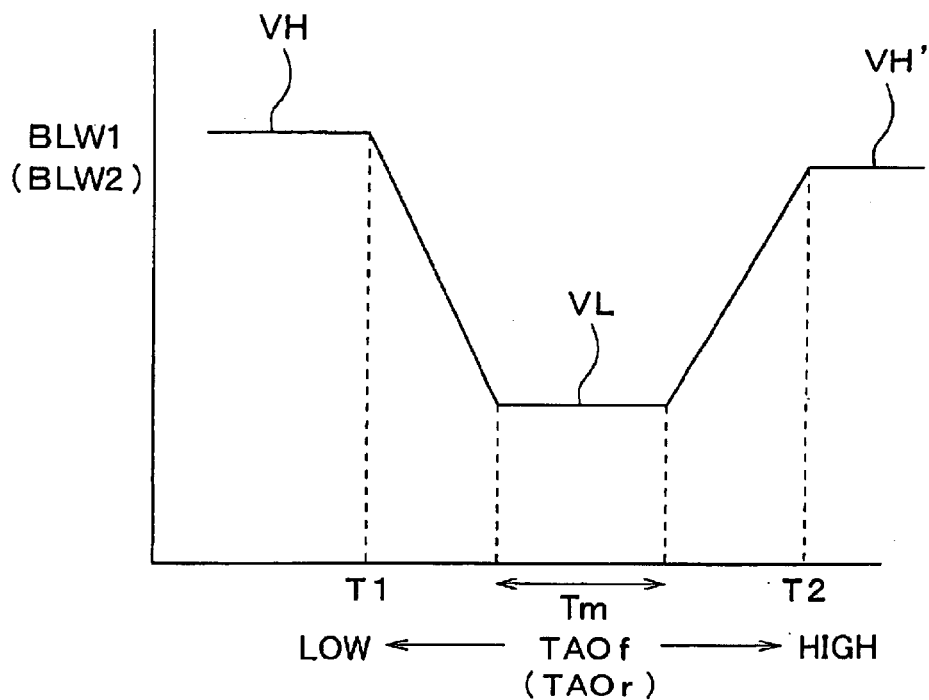
FIG. 5 is a graph showing a control characteristic of an electric voltage applied to a main blower according to the embodiment.

More specifically, as shown in FIG. 5, when the front target air temperature TAOf is in a low temperature range lower than a first predetermined temperature T1 (in a maximum cooling state of the front air mixing door 19), the main blower input voltage BLW1 is increased to a maximum value VH so as to control the rotation speed of the driving motor of the main blower 10 to a maximum value. In this case, the air amount of the main blower 10 is set at a maximum value.

Then, as the front target air temperature TAOf is increased higher than the first predetermined temperature, the main blower input voltage BLW1 is gradually decreased and when the front target air temperature TAOf is increased to a middle temperature range Tm, the main blower input voltage BLW1 is set to a minimum value VL. In this case, the air amount of the main blower 10 is set to a minimum value. Then, when the front target air temperature TAOf is increased higher than the middle temperature range Tm, the main blower input voltage BLW1 is gradually increased from the minimum value VL.

When the front target air temperature TAOf reaches a high temperature range (maximum heating state of the front air mixing door 19) higher than a second predetermined temperature T2 that is higher than the first predetermined temperature T1 by a predetermined temperature, the main blower input voltage BLW1 is set to a voltage VH' (VH'<VH) close to the above-described maximum voltage VH to again increase the air amount of the main blower 10 to the vicinity of the maximum air amount.

Next, at step S10, a sub-blower input voltage BLW2 applied to the motor 27c for driving the rear sub-blower 27 is preliminarily determined on the basis of the rear target air temperature TAOr. This preliminary determination of the sub-blower input voltage BLW2 is performed in the same way as the above-described main blower input voltage BLW1 in FIG. 5 with respect to a change in the rear target air temperature TAOr. Therefore, specific description of the preliminary determination of the sub-blower input voltage BLW2 will be omitted.

This preliminarily determined sub-blower input voltage BLW2 is corrected on the basis of the main blower input voltage BLW1 at step S11 to finally determine the sub-blower input voltage BLW2.

Figure 6:
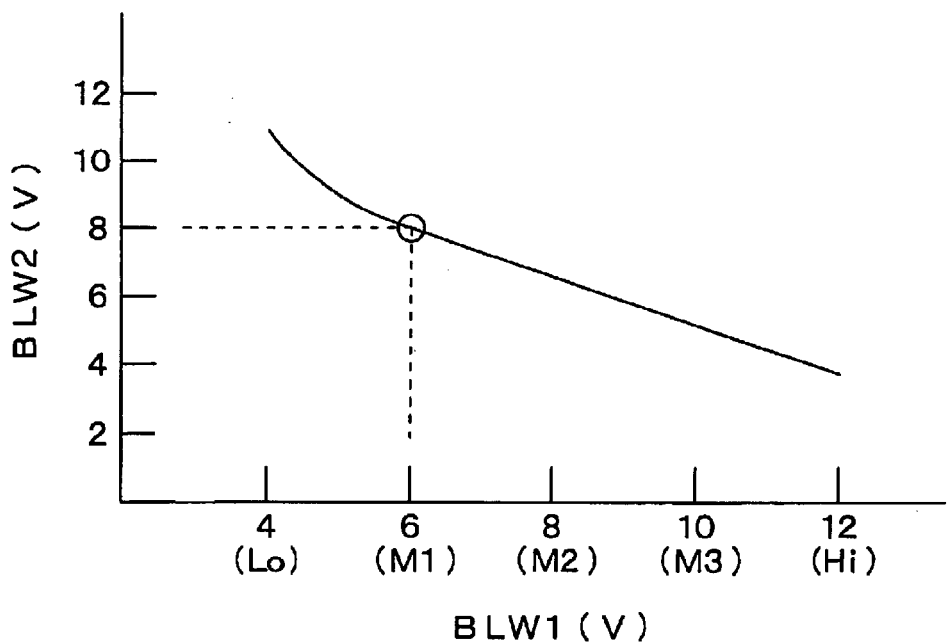
FIG. 6 is a graph showing a control characteristic (correction) of an electric voltage applied to a sub-blower according to the embodiment.

FIG. 6 shows an example of a specific correction method of the sub-blower input voltage BLW2. As shown in FIG. 6, as the main blower input voltage BLW1 decreases, the sub-blower input voltage BLW2 is corrected to an increasing side. In FIG. 6, Lo, M1, M2, M3 and Hi indicate voltage levels applied to the main blower 10.

Generally, when the main blower input voltage BLW1 decreases and hence the air amount of the main blower 10 decreases, the rear blowing air amount decreases even if the sub-blower input voltage BLW2 is maintained at the same value. However, in this embodiment, as shown in FIG. 6, by correcting the sub-blower input voltage BLW2 to be increased in response to a decrease in the main blower input voltage BLW1, the rear blowing air amount can be kept at a constant value irrespective of a change in the air amount of the main blower 10.

Next, at step S12, the control signals determined at the above-described steps S5 to S10 are outputted to the driving motor 12 of the main blower 10, the driving motor 27 of the rear sub-blower 27, and the respective actuator motors 60 to 65 to control the operations of the respective air conditioning parts.

In this embodiment, the first air passage of the present invention is constructed with the front cold air passage 17, the front air mixing portion 20 and front air outlet ports 21, 22, 23, and the second air passage of the present invention is constructed with the rear cold air passages 18, the hot air inlet spaces 27k, the cold air inlet spaces 27m, the rear air ducts 28, the rear ducts 36, and the rear foot ducts 37.

Further, a first air amount control means (air amount control unit of the main blower 10) of the present invention is constructed of step S9 in FIG. 4, and a second air amount control means (air amount control unit of the sub-blower 27) of the present invention is constructed of steps S10, S11 in FIG. 4.

(Other Embodiments)

Although the present invention has been fully described in connection with the preferred embodiment thereof with reference to the accompanying drawings, it is to be noted that various changes and modifications will become apparent to those skilled in the art.

For example, in the above-described embodiment, there is described regarding the example in which the hot air doors 31 are operated by the rear hot air operating mechanism and the cold air doors 32 are operated by the rear cold air operating mechanism, independently from the hot air doors 31. However, it is possible to operate the hot air doors 31 and the cold air doors 32 by using a single common rear temperature adjusting mechanism, if there is provided a link mechanism which can compatibly set a door operation state where the hot air doors 31 and the cold air doors 32 are fully closed at the same time to set the rear shut state, and a door operation state where both of the hot air doors 31 and the cold air doors 32 are operated between a fully closed side and to a fully open side in a canceling manner in synchronization with each other so as to control a rear-blowing air temperature.

Further, if the rear shut state can be set by the rear air outlet mode doors 35 in the above-described embodiment, it is possible to operate all of the four hot air doors 31 and the four cold air doors 32 in synchronization with each other by the single common rear temperature adjusting mechanism. In this case, both of the hot air doors 31 and the cold air doors 32 can be constructed of a single plate door for adjusting the temperature of air to be blown to the rear seat area of the passenger compartment.

Still further, examples in which the sub-blower 27 and the rear air ducts 28 are integrated with the case 14 have been described in the above-described embodiment, but the present invention can be applied also to a case where the rear air ducts 28 are separated from the case 14 and is formed on the side of the rear air ducts 36, 37 and where the rear sub-blower 27 is provided in the rear air ducts 28 separated from the case 14.

Still further, examples in which both of the front area and the rear area in the passenger compartment are air-conditioned by the front air conditioning unit have been described in the above-described embodiment. However, air flow resistance in a seat side air passage is increased as compared with the front air passage also in a case where the front area and the passenger's seats in the passenger compartment are air-conditioned by the front air conditioning unit. In this case, a sub-blower 27 exclusive to the seat side air passage may be provided to produce the same operation effect. Still further, it is also recommended to apply the present invention to a case where conditioned air is sent to both of the rear area and the passenger's seats in the passenger compartment by the sub-blower 27.

Still further, it is also recommended to arrange face air outlet ports each provided with an air outlet grille capable of adjusting the direction of air in the upper portions of the center pillars of the vehicle (i.e., B pillar between the front door and the rear door of the vehicle), and to introduce conditioned air from the front air conditioning unit into the face air outlet ports arranged in the center pillars via the rear face ducts 36 by the sub-blower 27 to blow off conditioned air mainly to the rear area from these face air outlet ports. Here, by providing the face air outlet ports in the center pillars with the grille mechanisms capable of adjusting the blowing direction of air, it is possible to blow conditioned air from the face air outlet ports in the center pillars toward the front area of the present compartment.

In the above-described embodiment, examples in which various kinds of operating mechanisms are constructed of actuator mechanisms are described. However, these operating mechanisms can be constructed of manual operating mechanisms if necessary. Further, in the above-described embodiment, the front air mixing door 19, the rear hot air door 31 and the rear cold air door 32 are constructed with rotatable plate doors, but can be constructed with film doors.

Such changes and modifications are to be understood as being within the scope of the present invention as defined by the appended claims.

What is claimed is:

1. An air conditioner for a vehicle having a passenger compartment, the air conditioner comprising:

a main blower for blowing air;

a heat exchanger unit for performing heat exchange with air blown by the main blower;

a case for accommodating the heat exchange unit, the case having a first air passage through which conditioned air after being heat-exchanged with the heat exchange unit flows toward a first area in the passenger compartment, and a second air passage through which conditioned air after being heat-exchanged in the heat exchange unit flows toward a second area in the passenger compartment, the second air passage having an air flow resistance larger than that in the first air passage;

a sub-blower disposed in the second air passage, for blowing conditioned air in the second air passage toward the second area of the passenger compartment; and a control unit for controlling operation of the main blower and the sub-blower, the control unit including a first control means for controlling an air amount blown by the main blower, and a second control means for controlling an air amount blown by the sub-blower; wherein the second control means corrects the air amount blown by the sub-blower in accordance with a change of the air amount blown by the main blower; and the second control means increases the air amount blown by the sub-blower in accordance with a decrease of the air amount blown by the main blower.

2. The air conditioner according to claim 1, further comprising:

a first temperature adjustment unit disposed for adjusting a temperature of the conditioned air in the first air passage, to be blown to the first area in the passenger compartment; and a second temperature adjustment unit disposed for adjusting a temperature of the conditioned air in the second air passage, to be blown to the second area in the passenger compartment, wherein:

the control unit further includes a first target temperature calculating means for calculating a first target temperature of conditioned air to be blown to the first area of the passenger compartment, and a second target temperature calculating means for calculating a second target temperature of conditioned air to be blown to the second area of the passenger compartment;

the first control means controls a voltage applied to a driving motor of the main blower in accordance with the first target temperature;

the second control means determines a voltage applied to a driving motor of the sub-blower in accordance with the second target temperature; and the second control means corrects the voltage applied to the driving motor of the sub-blower in accordance with the voltage applied to the driving motor of the main blower.

3. The air conditioner according to claim 1, wherein the sub-blower is arranged integrally with the case.

4. The air conditioner according to claim 1, wherein:

the first area is a front seat area in the passenger compartment;

the first air passage is a front air passage through which air flows toward the front seat area;

the second area is a rear seat area in the passenger compartment; and the second air passage is a rear air passage through which air flows toward the rear seat area.

5. The air conditioner according to claim 4, wherein the rear air passage includes a rear face passage through which air flows toward a rear upper side, and a rear foot passage through which air flows toward a rear lower side, the air conditioner further comprising a rear mode selecting unit for opening and closing the rear face opening and the rear foot opening.

6. The air conditioner according to claim 2, wherein the second control means increases the voltage applied to the driving motor of the sub-blower in accordance with a decrease of the voltage applied to the driving motor of the main blower.

* * * * *